(12) United States Patent
Menna et al.

(10) Patent No.: US 8,646,018 B2
(45) Date of Patent: Feb. 4, 2014

(54) INCREASED CABLE TELEVISION TAP BANDWIDTH UTILIZING EXISTING TAP HOUSINGS

(75) Inventors: Rudolph J. Menna, Harleysville, PA (US); Philip Miguelez, Warminster, PA (US)

(73) Assignee: General Instrument Corporation, Horsham, PA (US)

( * ) Notice: Subject to any disclaimer, the term of this patent is extended or adjusted under 35 U.S.C. 154(b) by 380 days.

(21) Appl. No.: 12/606,165

(22) Filed: Oct. 26, 2009

(65) Prior Publication Data

US 2011/0099600 A1  Apr. 28, 2011

(51) Int. Cl.
  *H04N 7/173* (2011.01)
  *H05K 9/00* (2006.01)
(52) U.S. Cl.
  USPC ............. 725/127; 725/126; 725/128; 333/25; 174/382
(58) Field of Classification Search
  USPC .................................. 725/126–128; 174/382
  See application file for complete search history.

(56) References Cited

U.S. PATENT DOCUMENTS

| | | | | |
|---|---|---|---|---|
| 4,408,255 A | * | 10/1983 | Adkins | 361/689 |
| 5,428,506 A | * | 6/1995 | Brown et al. | 361/794 |
| 5,617,095 A | * | 4/1997 | Kim et al. | 342/1 |
| 5,639,989 A | * | 6/1997 | Higgins, III | 174/386 |
| 5,689,275 A | * | 11/1997 | Moore et al. | 343/786 |
| 5,814,905 A | | 9/1998 | Tang | |
| 5,815,794 A | * | 9/1998 | Williams | 725/125 |
| 5,819,159 A | * | 10/1998 | Dail | 725/125 |
| 6,049,693 A | * | 4/2000 | Baran et al. | 725/124 |
| 6,210,206 B1 | * | 4/2001 | Durham | 439/416 |
| 6,497,587 B2 | * | 12/2002 | Di Mario | 439/578 |
| 6,786,771 B2 | * | 9/2004 | Gailus | 439/607.01 |
| 6,939,161 B1 | * | 9/2005 | Yi et al. | 439/373 |
| 6,973,670 B1 | * | 12/2005 | Yoshida et al. | 725/121 |
| 7,135,643 B2 | * | 11/2006 | van Haaster et al. | 174/382 |
| 7,574,730 B1 | * | 8/2009 | Masuda et al. | 725/124 |
| 2002/0157117 A1 | * | 10/2002 | Geil et al. | 725/139 |
| 2004/0139477 A1 | * | 7/2004 | Russell et al. | 725/126 |
| 2005/0034167 A1 | | 2/2005 | Weinstein et al. | |
| 2006/0096773 A1 | * | 5/2006 | Cochrance | 174/35 R |
| 2006/0218593 A1 | * | 9/2006 | Afshary et al. | 725/74 |
| 2006/0271147 A1 | * | 11/2006 | MacDonald | 607/119 |
| 2008/0283290 A1 | * | 11/2008 | Niino et al. | 174/350 |
| 2009/0029602 A1 | * | 1/2009 | Cohen et al. | 439/719 |

* cited by examiner

*Primary Examiner* — An Son P Huynh
(74) *Attorney, Agent, or Firm* — Stewart M. Wiener

(57) ABSTRACT

In general, in one aspect, the disclosure describes a resonance restricting material in communication with a bypass line of a cable television tap. The bypass line generates resonances at a defined frequency in response to RF parameters in the tap and the resonances increase insertion losses at the defined frequency and precludes bandwidth of the tap being increased above the defined frequency. The resonance restricting material may attenuate the resonances generated by the bypass line at the defined frequency (e.g., approximately 1.2 GHz) and reduce insertion losses at the defined frequency and enable the bandwidth of the tap to be increased (e.g., from 1.0 GHz to 1.5 GHz).

23 Claims, 11 Drawing Sheets

US 8,646,018 B2

INCREASED CABLE TELEVISION TAP BANDWIDTH UTILIZING EXISTING TAP HOUSINGS

BACKGROUND

Cable television (CATV) operators provide cable television and other services such as Internet connectivity and digital telephone service. The CATV network may include fiber optic and coaxial cables that provide bidirectional transport of radio frequency (RF) signals. Customers may connect to the CATV network utilizing cables to connect to a main transmission line via taps in the main transmission line.

FIG. 1 illustrates an example block diagram of a CATV network 100 utilizing a tap 110 on a main transmission line 120 to provide connectivity to a customer via cables 130. The tap 110 receives RF signals on the main transmission line 120 from a central office (upstream) and transmits the RF signals downstream over the main transmission line 120. The tap 110 may also receive RF signals from downstream and transmit the RF signals upstream. The tap 110 may include RF circuitry 140 to process the RF signals destined for the customer so the RF signals can be provided to the customer via the cable 130. Likewise, RF signals received from the customer via the cable 130 may be processed so they can be transmitted via the main transmission line 120.

In addition to providing the processing of the RF signals necessary for communication with the customer, the RF circuitry 140 may provide a conduit (transmission line) for continued communications over the main transmission line 120. The tap 110 may include a bypass line 150 that provides an alternative conduit (transmission line) for maintaining communications over the main transmission line 120 in the event that the RF circuitry 140 is removed from the path for any reason (e.g., failure, maintenance, repair, upgrade).

The taps may include a housing and a tap plate. The housing may include connectors to secure ends of the main transmission line 120 and to provide RF shielding. The tap plate may include the RF circuitry 140 to perform necessary processing of the RF signals for communications with the customer. The tap plate may also include on or more connectors for providing connectivity to the customer via cables connected thereto. The tap plate may also provide a transmission line to allow the RF signals and power to pass therethrough. The bypass line 150 may be located within the housing and be utilized when the tap plate is removed from the circuit (e.g., removed for maintenance).

FIG. 2 illustrates an example tap 200 with the tap plate (RF circuitry) removed. The tap includes a housing 210 that has an input connector 220 to connect to and receive the main transmission line 205 from upstream and a connector 230 to connect to and provide the main transmission line 205 to downstream. The tap 200 includes interfaces 225, 235 (conductors) in communication with the main transmission line 205 via the connectors 220, 230. When the tap plate (RF circuitry) is installed the interfaces 225, 235 are also in communication with the tap plate. In the downstream direction, the interface 225 is used to provide the RF signals and power from the main transmission line 205 to the tap plate and the interface 235 is used to provide the RF signals and power from the tap plate to the main transmission line 205. The tap plate provides a conduit (transmission line) for communications between ends of the main transmission line 205 connected to the tap 200.

The tap 200 also includes a bypass line 240 to provide an alternative conduit (transmission line) to maintain communications between ends of the main transmission line 205 when the tap plate is removed. The bypass line 240 may be capable of being connected or disconnected from the connectors 220, 230 based on whether the tap plate is installed or not. For example, the bypass line 240 may be connected to conductive movable shafts that may be connected to the connectors 220, 230. When the tap plate is installed, the conductive movable shafts may be pushed down so as not to be connected to the connectors 220, 230. Since the conductive movable shafts are not connected to the connectors 220, 230 the bypass line 240 is not in communication with the connectors 220, 230. When the tap plate is removed (off), the conductive movable shafts may shift up and contact the connectors 220, 230. Since the conductive movable shafts are connected to the connectors 220, 230 the bypass line 240 is in communication with the connectors 220, 230 and acts as the conduit to maintain communications between ends of the main transmission line 205.

Present CATV taps 200 may provide a bandwidth of 1 GHz. With additional services being provided over the CATV network and the increased desire for faster download and/or upload speeds, there is a desire for additional bandwidth. The bandwidth may currently be limited to 1 GHz due to electrical limitations of the current tap plate as well as mechanical design features of the tap 200.

When the tap plate is installed, the bypass line 240 is disengaged but still presents a transfer impedance that is in parallel to the tap plate (RF input to output electronics). The bypass line 240 responds to the RF parameters within the tap 200 to produce resonances that occur above 1 GHz (at approximately 1.2 GHz). These resonances significantly influence the tap's input to output insertion loss and limit extending the tap bandwidth above 1 GHz (may be able to extend the bandwidth to 1.2 GHz with a new tap plate). The bandwidth may not be extended above 1 GHz (or possibly 1.2 GHz) unless the entire tap is replaced to modify the response of the bypass lines 240 to the RF. Replacing the entire tap requires physically removing the existing tap and replacing it with a new tap. This would require a significant time and cost investment by the CATV operator.

FIG. 3 illustrates an example graph of the input to output insertion loss of a conventional (present field-installed) tap. As illustrated, at approximately 1.2 GHz the loss increases by approximately 3 db and this increase in loss prevents extending the bandwidth above this point.

Being able to extend the bandwidth of the taps without having to physically replace the current taps with new taps would dramatically improve the cost and down time of future RF network upgrades beyond 1 GHz.

SUMMARY

A cable television tap comprising a housing, connectors, a tap plate, a bypass line and resonance restricting material. The connectors are to receive a main transmission line. The tap plate is in communication with the connectors to receive RF signals from the main transmission line, to provide a conduit for the RF signals to pass through the tap, and to process the RF signals for communication with a customer. The bypass line is to provide an alternative conduit through the tap when the tap plate is removed. The resonance restricting material is in communication with the bypass line, reduces resonances generated by the bypass line and insertion losses in RF range, and enables bandwidth for the cable television tap to be increased.

A cable television tap utilized in a cable television network to provide a connection point for a customer to access services provided by the cable television network. The tap includes a housing, connectors to secure to a main transmission line, a tap plate to process RF signals to provide for communication with the customer, and a bypass line to provide an alternative conduit through the tap when the tap plate is removed. The bypass line generates resonances at a defined frequency in response to RF parameters in the tap and the resonances increase insertion losses at the defined frequency and precludes bandwidth of the tap being increased above the defined frequency. A resonance restricting material is provided in communication with the bypass line. The resonance restricting material attenuates the resonances generated by the bypass line at the defined frequency, reduces the insertion losses at the defined frequency, and enables the bandwidth of the tap to be increased without requiring the housing to be replaced.

Bandwidth of a field-installed cable television tap may be increased by removing a tap plate from the tap, installing a resonance restricting material in communication with a bypass line for the tap, and installing the tap plate on the tap, wherein the tap plate supports increased bandwidth. The resonance restricting material attenuates resonances generated by the bypass line at a defined frequency, reduces the insertion losses at the defined frequency, and enables the bandwidth of the tap to be increased above the defined frequency.

BRIEF DESCRIPTION OF THE DRAWINGS

The features and advantages of the various embodiments will become apparent from the following detailed description in which.

DETAILED DESCRIPTION

Figure 1:
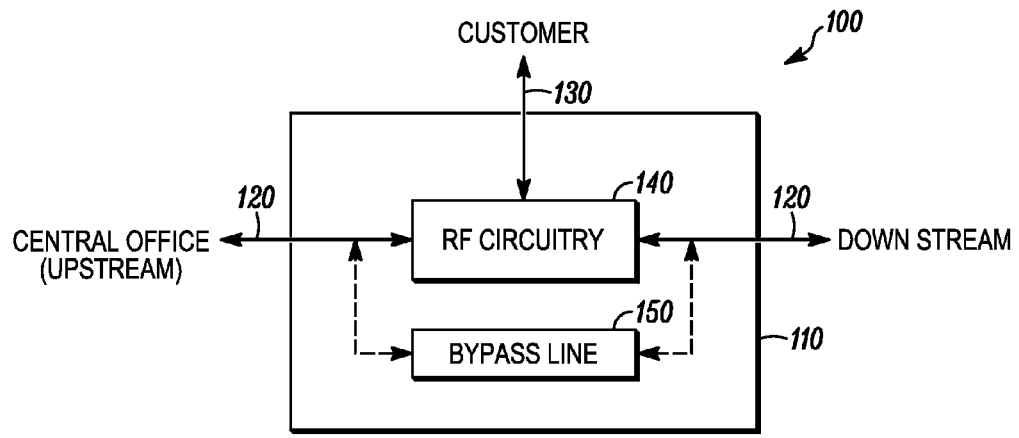
FIG. 1 illustrates an example block diagram of a CATV network utilizing a tap on a main transmission line to provide connectivity to a customer.
Figure 2:
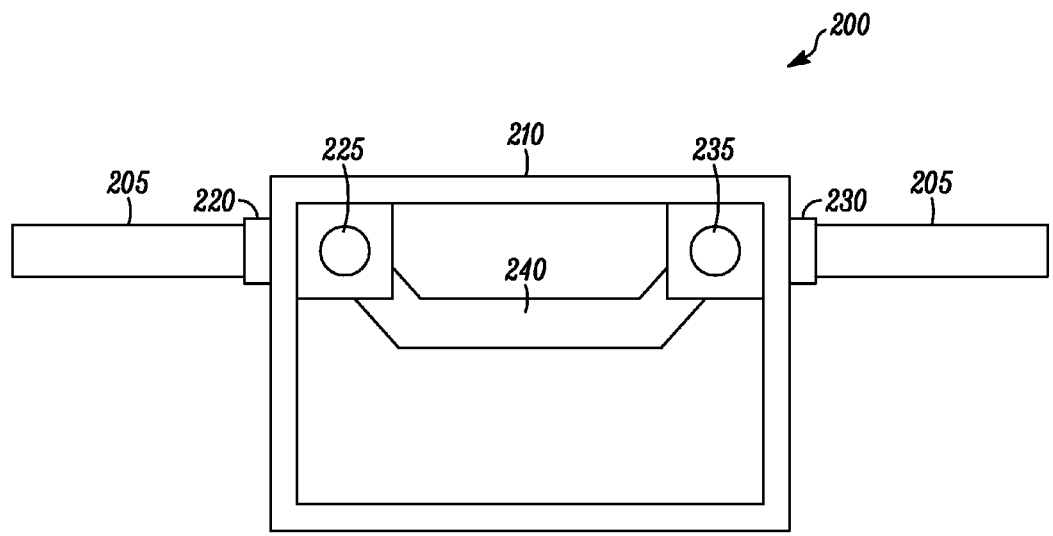
FIG. 2 illustrates an example tap with the tap plate (RF circuitry) removed.

As taps are an integral part of the CATV network, in order to increase the bandwidth of the CATV network the taps need to be able to support the additional bandwidth. The tap plates (RF circuitry) have to be modified to process the additional bandwidth. In addition, the resonances generated by the bypass line as a result of the RF parameters within the tap need to be restricted, attenuated and/or shifted up the frequency spectrum (collectively referred to as controlled) so as not to impact the increased bandwidth. The resonances generated may be controlled by modifying the RF parameters of the tap or the interaction of the bypass line to the RF parameters. This may be done by, for example, replacing or modifying the housing, or replacing or modifying the bypass line within the tap. However, these options are cost and labor intensive. In addition, these options may require the main transmission line feeding the taps being modified or replaced to be shut down during the modification or replacement and thus may affect network availability.

What is needed is a way to modify the resonances generated without having to replace or modify the current tap housings or bypass lines. However, utilizing the same housing will result in the same basic RF parameters therewithin and utilizing the same bypass line will result in the same response to the RF. Accordingly, the interaction of the RF and the bypass line needs to be altered in some fashion within the existing tap housing.

According to one embodiment, a material capable of blocking RF may be placed on or around the bypass line to limit the RF that reaches the bypass line. The material may, for example, be a material utilized for electromagnetic interference (EMI) shielding. Limiting the RF that interacts with the bypass line may change the bypass lines response to the RF parameters of the tap. In addition, according to an embodiment, the material may exhibit lossy characteristics (signal loss) in the RF range at or about the point where the resonances are generated by the bypass line (e.g., above 1 GHz). The use of the material in communication with the bypass line may modify (reduce) the quality factor (Q) of the bypass line. Reducing the Q of the bypass line may minimize the resonances generated at the lossy frequencies (e.g., above 1 GHz). Minimizing the resonances generated reduces the input to output insertion loss of the tap at these frequencies and may enable expansion of the tap bandwidth without having to replace the tap housing.

In one embodiment, the material may be highly resistive or alternatively may have low resistivity but have a dielectric connected thereto to prevent inadvertent shorting of the alternating current (AC) power in the tap. The material may, for example, be a soft material that may be shaped to be in communication with the bypass line and fit within the housing. In one embodiment, the material may be a ferromagnetic material. The material may be, for example, a conductive elastomer that includes an elastomer binder (e.g., silicone) and a conductive filler (e.g., a combination of nickel (Ni) and carbon (C)).

The material may be contained within, for example, a clip or a sleeve that can be slide over the bypass line with relative ease and once in place secure the material to the bypass line. The clip/sleeve may, for example, be made of a non-conductive material to enable the installer to secure the material to the bypass line, while limiting the risk of accidently grounding themselves to the power being transmitted over the bypass line. According to an embodiment, the clip may be made of a flexible material that can tolerate the elements within the tap (e.g., plastic).

Figure 4:
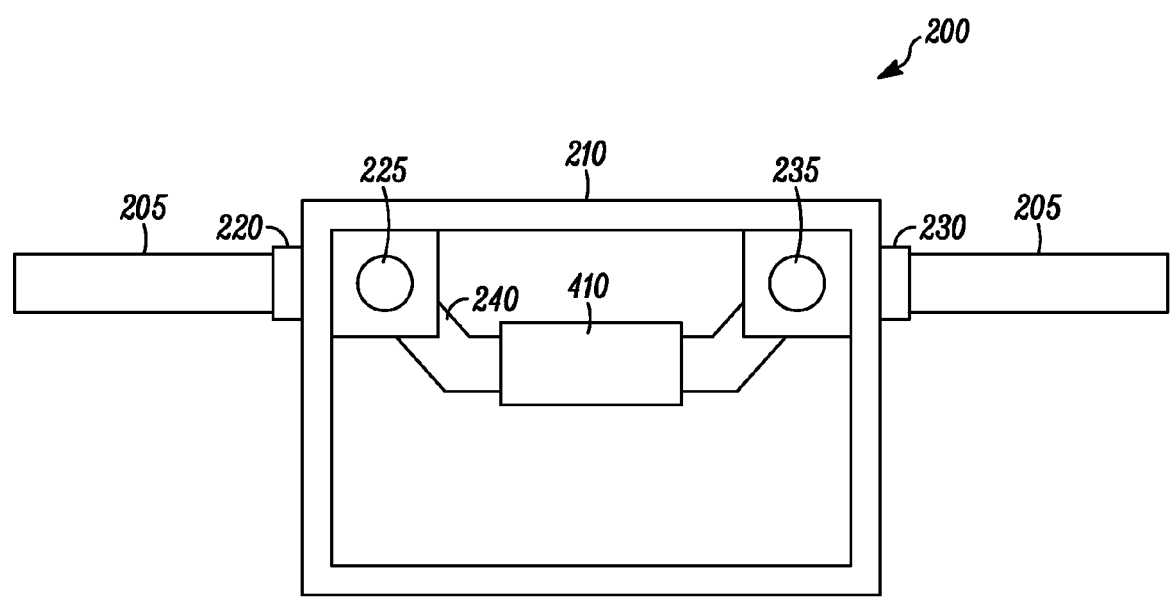
FIG. 4 illustrates an internal view of the example tap having a material that may block RF signals and exhibit lossy characteristics in the RF range in communication with the bypass line, according to one embodiment.

FIG. 4 illustrates an internal view of the example tap 200 having a material 410 that may block RF signals and exhibit lossy characteristics in the RF range in communication with the bypass transmission line 240, according to one embodiment. The material 410 exhibiting these characteristics will be referred to herein after as resonance restricting material 410. For ease of illustration, the resonance restricting material 410 is simply illustrated as being located on top of a portion of the bypass line 240, but is not limited thereto. Rather, the resonance restricting material 410 may be placed below, on the side, or some combination of the top, bottom and side without departing from the current scope. In fact, placing the resonance restricting material 410 below the bypass line so that the resonance restricting material 410 replaces or supplements air as the dielectric between the bypass line 240 and the bottom of the housing may provide results that are desirable and be utilized alone or in combination with the side and/or top.

Moreover, the portion of the bypass line 240 that is in communication with the resonance restricting material 410 is not limited to any specific percentage and may be selected, for example, based on providing the desired result or the ease of installation. The location and installation of the resonance restricting material 410 will be discussed in more detail later.

Figure 3:
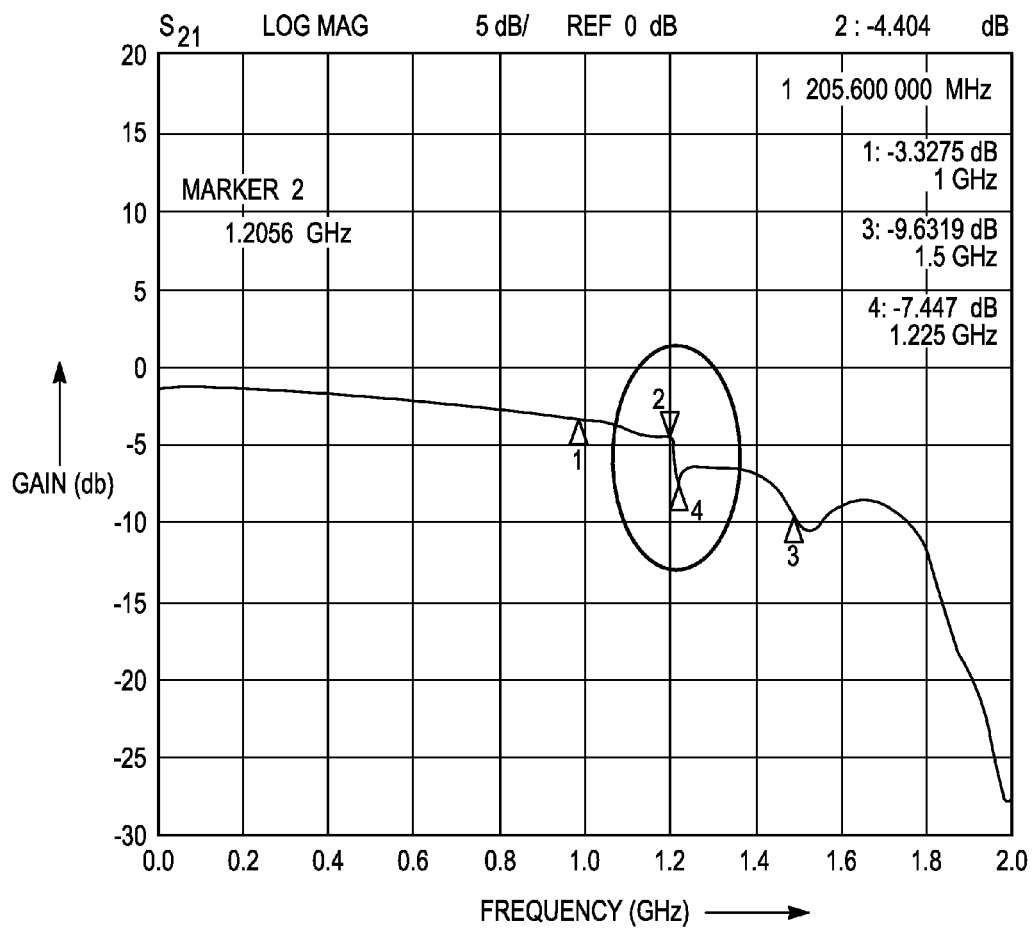
FIG. 3 illustrates an example graph of the input to output insertion loss of a conventional (present field-installed) tap.

The use of the resonance restricting material 410 within conventional (present field-installed) taps 200 that are utilized to provide 1 GHz bandwidth may reduce or eliminate the resonances generated by the bypass line 240 at approximately 1.2 GHz that resulted in substantial signal loss at that point (see FIG. 3) or may shift the resonances and the associated signal losses further out in the RF spectrum.

Figure 5:
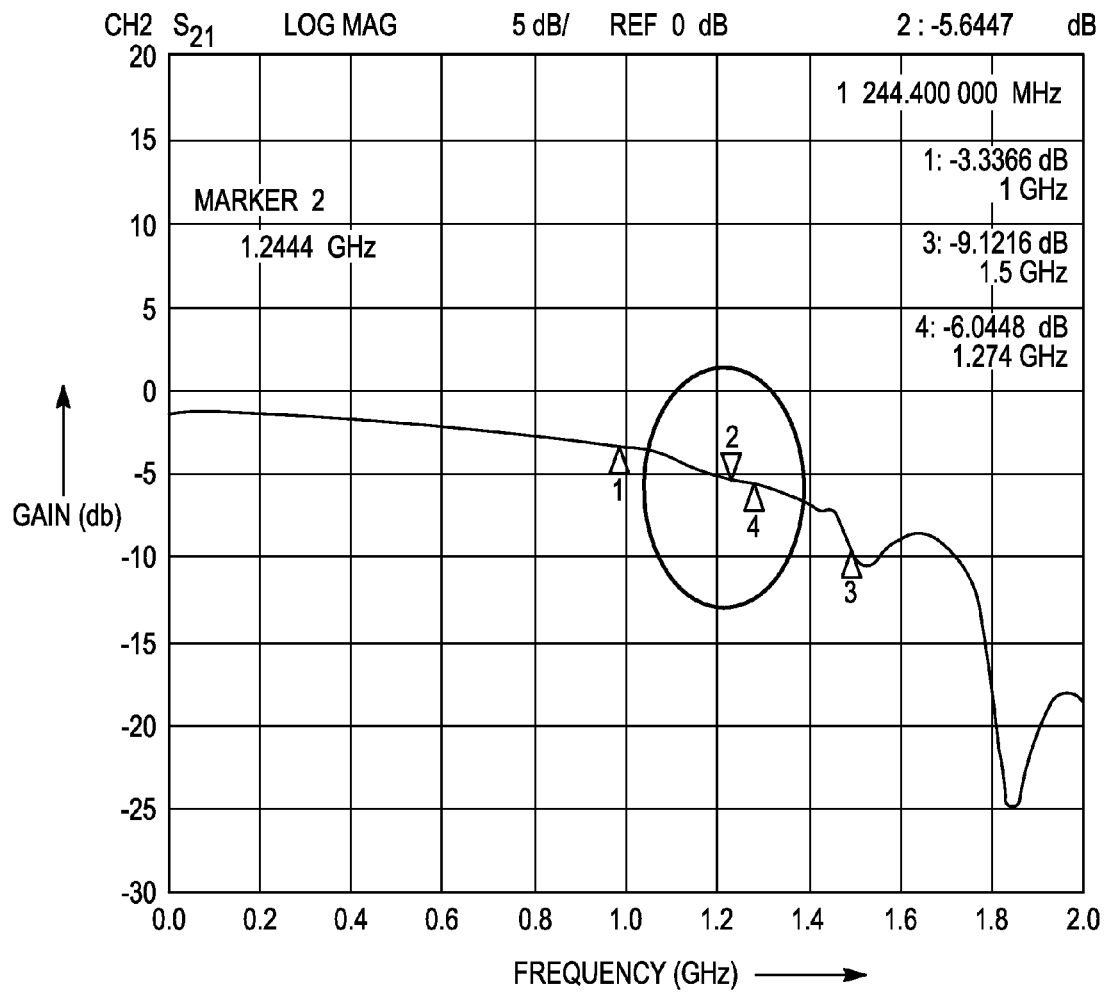
FIG. 5 illustrates an example graph of the input to output insertion loss of a conventional (present field-installed) tap utilizing the resonance restricting material in communication with the bypass line, according to one embodiment.

FIG. 5 illustrates an example graph of the input to output insertion loss of a conventional (present field-installed) tap utilizing the resonance restricting material 410 in communication with the bypass line 240, according to one embodiment. As illustrated, the additional loss of approximately 3 db at approximately 1.2 GHz present in conventional taps has substantially been reduced. By utilizing the resonance restricting material 410 in communication with the bypass line 240 the bandwidth of the taps may be extended to approximately 1.5 GHz.

The resonance restricting material 410 may be highly resistive. Alternatively, the resonance restricting material 410 may have low resistivity but have a dielectric connected thereto to prevent inadvertent shorting of the alternating current (AC) power in the tap 200. The dielectric may be coated onto an exterior surface of the material 410. The thickness of the resonance restricting material 410 may be such that it provides the necessary properties (e.g., shielding, reduction of Q) when in communication with the bypass line 240 but does not interfere with or come in contact with other components of the tap 200 either during or after installation. The resonance restricting material 410 may be a soft material that may be shaped to be in communication with the bypass line 240 and fit within the housing 210.

The resonance restricting material 410 may be a ferromagnetic material. According to one embodiment, the resonance restricting material 410 may be a conductive elastomer that includes an elastomer binder and a conductive filler. The elastomer binder may be silicone or silicone based and the conductive filler may a combination of nickel (Ni) and carbon (C). The conductive elastomer may be provided as sheet stock, may be die cut to the appropriate size or may come in a moldable form.

The resonance restricting material 410 needs to be capable of being installed on the bypass line 240 within the tap 200 in the field. As there is limited room within the tap 200, and the tap 200 may still be powered when the installation occurs, the installation needs to be easy and safe. According to one embodiment, the resonance restricting material 410 may be contained within a clip that can be slid over the bypass line 240 with relative ease and once in place secure the resonance restricting material 410 to the bypass line 240. The clip may be made of a non-conductive material to enable the installer to secure the resonance restricting material 410 to the bypass line 240, while limiting the risk of accidently grounding themselves to the power being transmitted over the bypass line 240. The clip may be made of a flexible material. The clip may be made of a material that can tolerate the elements within the tap 200. The clip may be made of plastic.

Figure 6A:
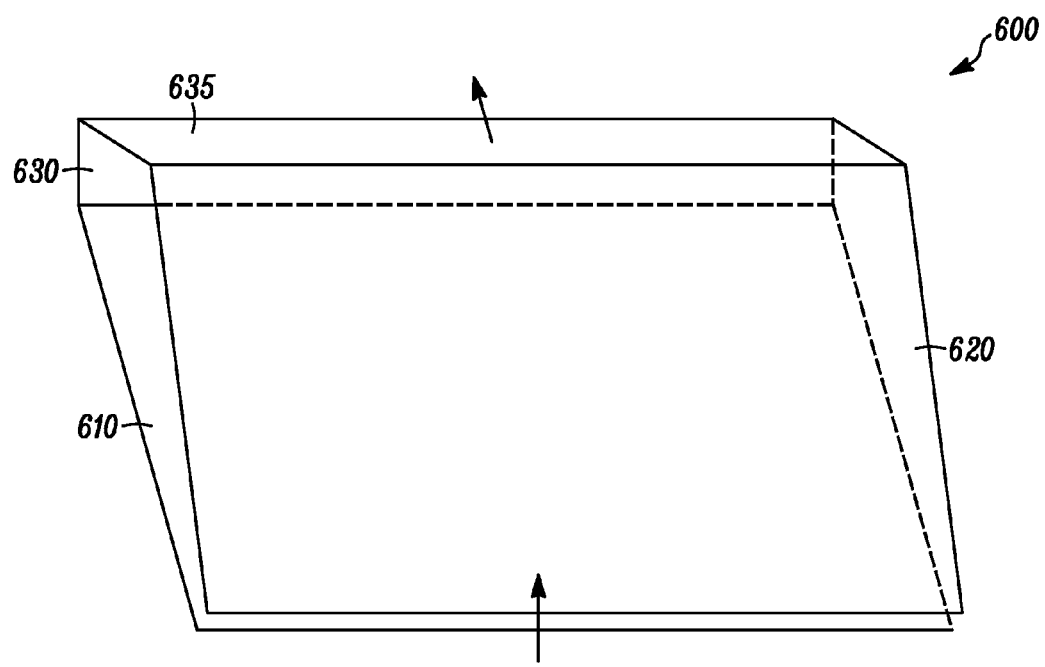
FIGS. 6A-B illustrate example clips that may be used to secure the resonance restricting material to the bypass line, according to various embodiments.
Figure 6B:
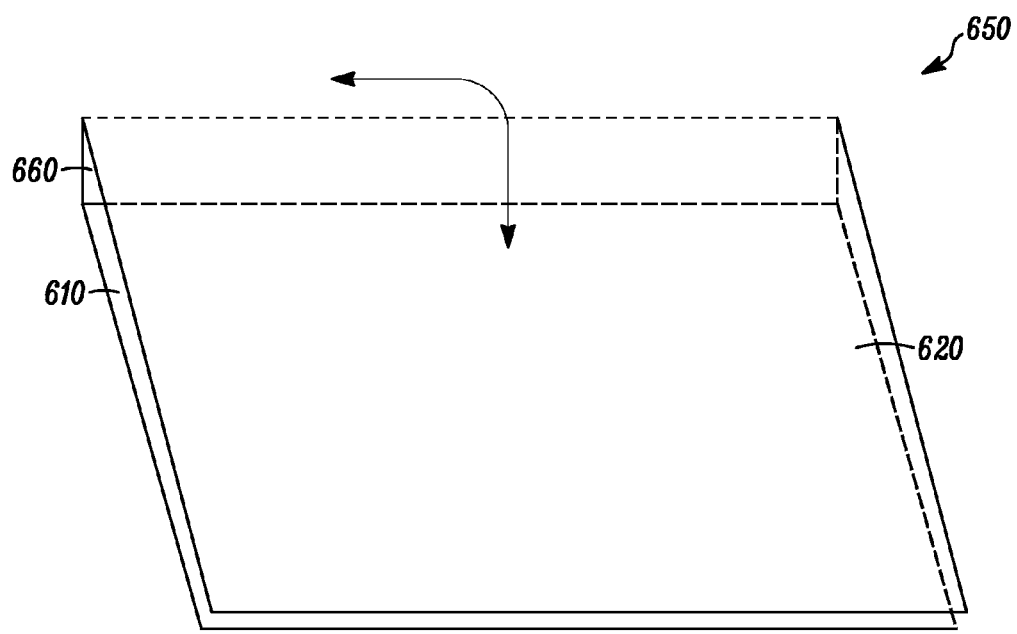

FIGS. 6A-B illustrate example clips that may be used to secure the resonance restricting material 410 to the bypass line 240, according to various embodiments. For ease of illustration, neither the resonance restricting material 410 nor the bypass line 240 is illustrated with the clips. The resonance restricting material 410 may be secured to the clips through various means. The resonance restricting material 410 may be located within the clips to be connected to a lower surface of the bypass line 240, an upper surface of the bypass line 240, an upper edge of the bypass line 240 or some combination thereof.

FIG. 6A illustrates a pinch clip 600 used to install and secure the resonance restricting material 410 to the bypass line 240, according to one embodiment. The clip 600 includes a lower face 610, an upper face 620, a first connecting wall 630 and a second connecting wall 635. The lower face 610 may be flexibly connected to the first connecting wall 630 so the angle between them can be modified when pressure is applied. The first connecting wall 630 and the second connecting wall 635 may be connected together at a defined angle. The upper face 620 may be connected to the second connecting wall 635 at a defined angle. In a steady state (no pressure applied to the connecting walls 630, 635) back edges of the lower and upper faces 610, 620 may be separated a greater distance then front edges. When the connecting walls 630, 635 are pushed away from the front edge (e.g., pinched together) the angle between the lower face 610 and the first connecting wall 630 may increase and the front edge of the upper face 620 may rotate up so that the distance between the front edges of the faces 610, 620 increases.

To install the clip 600, a technician may apply pressure to the second connecting wall 635 (e.g., push backward, push down) which causes the front edge of the upper face 620 to lift from the front edge of the lower face 610. With the increased spacing between the front edges, the technician can slide the clip 600 over the bypass line 240. Once the clip 600 is over the bypass line 240, the technician can release the pressure on the second wall 635 so that the front edge of the upper face 620 is lowered towards the front edge of the lower face 610 (returns to steady state). The front edges of the faces 610, 620 coming together may act to secure the clip 600 in place. The front edges of the faces 610, 620 may come together past a lower edge of the bypass line 240. Alternatively, the front edges of the faces 610, 620 may come together on the bypass line 240 to squeeze the bypass line 240.

FIG. 6B illustrates a hinged clip 650 used to install and secure the resonance restricting material 410 to the bypass line 240, according to one embodiment. The clip 650 includes the lower face 610, the upper face 620, and a connecting wall 660. The lower face 610 may be connected to the connecting wall 660 at a defined angle. The upper face 620 may be pivotally connected to the connecting wall 660 (e.g., hinge like connection). The pivoting of the upper face 620 with respect to the connecting wall 660 enables the front edge of the upper face 620 to be rotated to and away from the front edge of the lower face 610. To install the clip 650, a technician may swing the upper face 620 up to slide the clip 650 over the bypass line 240. Once the clip 600 is over the bypass line 240, the technician can swing the upper face 620 down so that the front edge of the upper face 620 is in close proximately of the front edge of the lower face 610.

The clips used to secure the resonance restricting material 410 to the bypass line 240 are in no way intended to be limited to the pinch clip 600 and the hinged clip 650 illustrated in FIGS. 6A-B respectively. Rather, any type of clip, sleeve, wrapping, or the like that enables the resonance restricting material 410 to be coupled to the bypass line 240, preferably in an easy and safe manner, is within the current scope.

For example, the faces 610, 620 are illustrated as being substantially the same size and being rectangular in shape but are in no way intended to be limited thereto. The connecting walls 630, 635, 660 are illustrated as extending substantially the length of the faces 610, 620 but are in no way intended to be limited thereto. Rather, the size and shape of the faces 610, 620 and the connecting walls 630, 635, 660 can be selected based on any number of parameters including the size and shape of the resonance restricting material 410, the size and shape of the bypass line 240, the location of the resonance restricting material 410 with respect to the bypass line 240 (e.g., top, bottom, top/bottom) and the size and accessibility of the tap 200. For example, if the resonance restricting material 410 is only being placed below the bypass line 240, the upper face 620 may simply be one or more arms used to secure the clip to the bypass line 240.

Figure 7A:
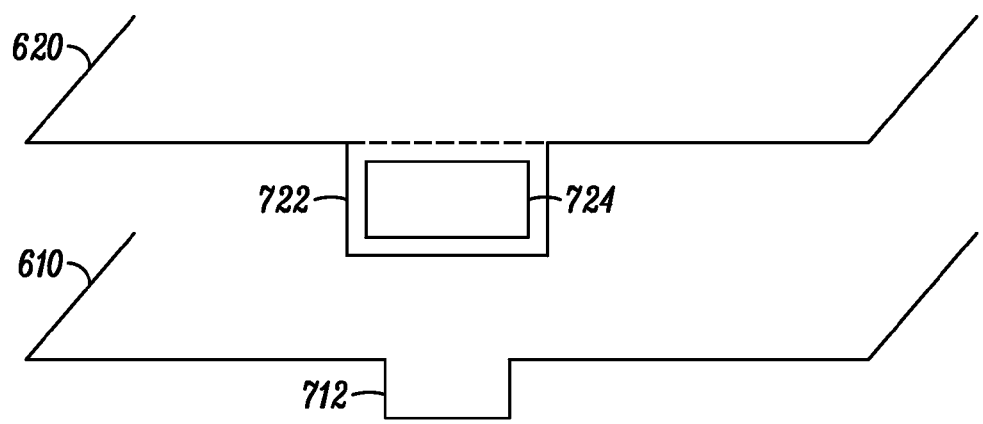
FIGS. 7A-B illustrate example mechanisms to secure the clips on the bypass line after installation, according to various embodiments.
Figure 7B:

According to one embodiment, the faces 610, 620 may be secured together in some fashion for additional support once the clip (e.g., 600, 650) is installed on the bypass line 240. FIGS. 7A-B illustrate example mechanisms to secure the clips on the bypass line 240 after installation, according to various embodiments.

FIG. 7A illustrates a tab and groove system to secure the faces 610, 620 of a clip (e.g., 600, 650) together after it has been installed on the bypass line 240, according to one embodiment. The lower face 610 includes a tab 712 formed in a front edge. The upper face 620 includes a pivoting flap 722 formed in a front edge thereof. The flap 722 has a groove 724 formed therein in alignment with the tab 712. Once the clip is installed on the bypass line 240 the flap 722 can be rotated down so that the groove 724 engages the tab 712.

The number and location of tabs 712 on the lower face 610 and flaps/grooves 722/724 on the upper face 620 may vary without departing from the current scope. In fact, according to one embodiment, the tabs 712 could be formed on the upper face 620 and flaps/grooves 722/724 could be formed on the lower face 610, and the flap 722 can be rotated up so that the groove 724 engages the tab 712 once the clip is installed on the bypass line 240.

FIG. 7B illustrates a pin and snap system to secure the faces 610, 620 of a clip (e.g., 600, 650) together after it has been installed on the bypass line 240, according to one embodiment. The lower face 610 includes female connectors 716 (e.g., snaps) in a front edge and the upper face 620 includes male connectors 726 (e.g., pins) formed in a front edge thereof in alignment with the snaps 716. Once the clip is installed on the bypass line 240, the technician may apply pressure on the upper face 620 so that the pins 726 enter and engage the snaps 716.

The number and location of snaps 716 on the lower face 610 and pins 726 on the upper face 620 may vary without departing from the current scope. In fact, according to one embodiment, the snaps 716 could be formed on the upper face 620 and pins 726 could be formed on the lower face 610.

The mechanisms to secure the clips after installation are in no way intended to be limited to the tab and groove 712/724 or pin and snap 716/726 illustrated in FIGS. 7A-B respectively. Rather, any type of mechanisms to secure the clips after installation is within the current scope.

If the resonance restricting material 410 is secured to a top surface of a face (e.g., 610, 620), when the clip is secured to the bypass line 240 the resonance restricting material 410 may be compressed therebetween. If the clip is too tight the resonance restricting material 410 may be overly compressed and damaged or the property of the material may be affected.

Figure 8A:
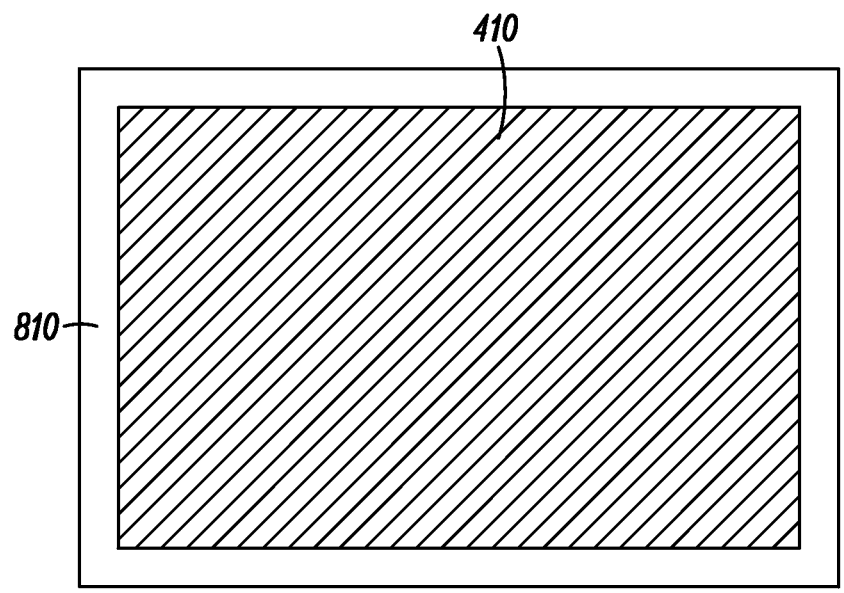
FIG. 8A illustrates an example face of a clip having a recessed portion formed therein for the resonance restricting material to fit within, according to one embodiment.

FIG. 8A illustrates a face (e.g., 610, 620) of a clip (e.g., 600, 650) having a recessed portion formed therein for the resonance restricting material 410 to fit within, according to one embodiment. The recess may be substantially the same depth as the depth of the resonance restricting material 410 so that an exterior of the recessed portion (e.g., sidewalls) 810 may be at approximately the same level as the resonance restricting material 410. When the clip is secured to the bypass line 240, the sidewalls 810 may control the amount of compression and prevent the resonance restricting material 410 from being adversely impacted.

Providing electrical contact between the resonance restricting material 410 and the housing may provide additional resonance reduction. However, for safety reasons and for the integrity of the resonance restricting material 410 a direct connection may not be desirable.

Figure 8B:
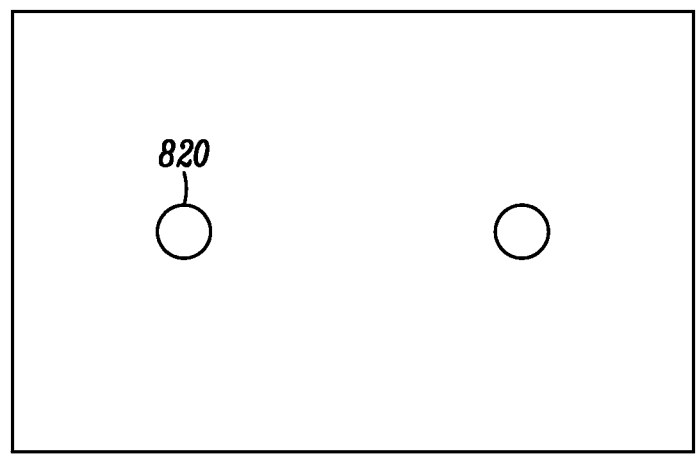
FIG. 8B illustrates an example bottom of a lower face of a clip having contacts formed therein, according to one embodiment.

FIG. 8B illustrates an example bottom of a lower face (e.g., 610) of a clip (e.g., 600, 650) having contacts 820 (e.g., copper). The lower face may have openings formed therein and the contacts 820 may connect to the resonance restricting material 410 through the openings. The contacts 820 may extend below the lower face and contact the housing when the clip is connected to the bypass line 240. The contacts 820 may help secure the clip in place.

In order to limit the down time of the CATV network, the installation of the material 410 onto the bypass line 240 in the taps 200 will likely occur while the tap 200 is still powered by the CATV network. Installing the resonance restricting material 410 while the tap 200 is powered, requires the installer to be careful to ensure that they do not accidently ground themselves to the power being transmitted therethrough (e.g., connectors 220, 230, interfaces 225, 235). Precautions may be taken prior to installation of the resonance restricting material 410 to prevent inadvertent contact with the connectors 220, 230 and the interfaces 225, 235.

Figure 9:
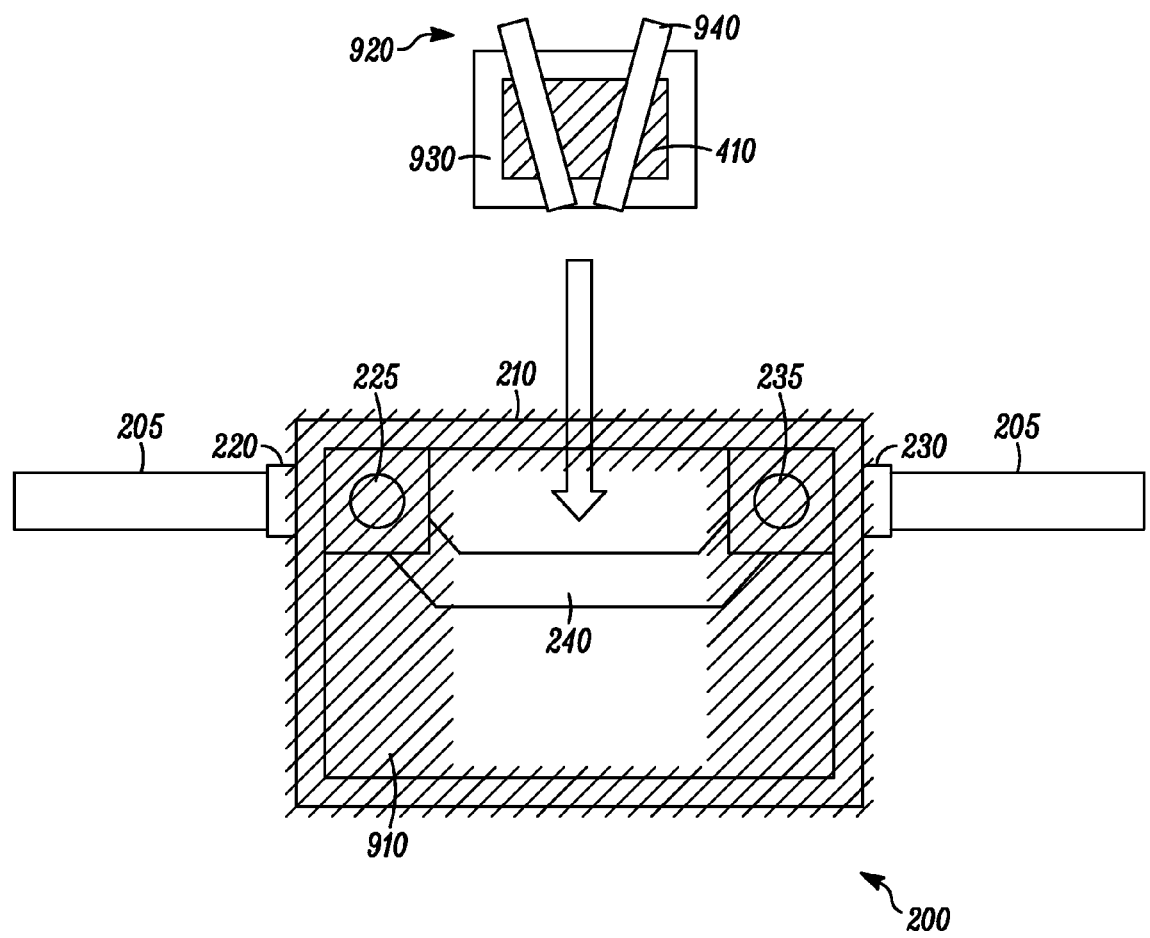
FIG. 9 illustrates an internal view of the example tap providing safety precautions prior to installation of the resonance restricting material, according to one embodiment.

FIG. 9 illustrates an internal view of the example tap 200 providing safety precautions prior to installation of the resonance restricting material 410, according to one embodiment. The tap 200 includes a safety shield 910 (non-conductive material) in communication with an upper surface of the housing 210 to cover the connectors 220, 230 and the interfaces 225, 235. The safety shield 910 may be placed over the housing 210 prior to installation of the clip 920 and resonance restricting material 410 on the bypass line 240. The safety shield 910 either may rest on the housing 210 or may be secured to the housing 210 (e.g., snapped on, screwed in). As illustrated, the clip 920 includes a lower face 930 that the resonance restricting material 410 is connected to and an upper face 940 that consists of two arms.

Figure 10:
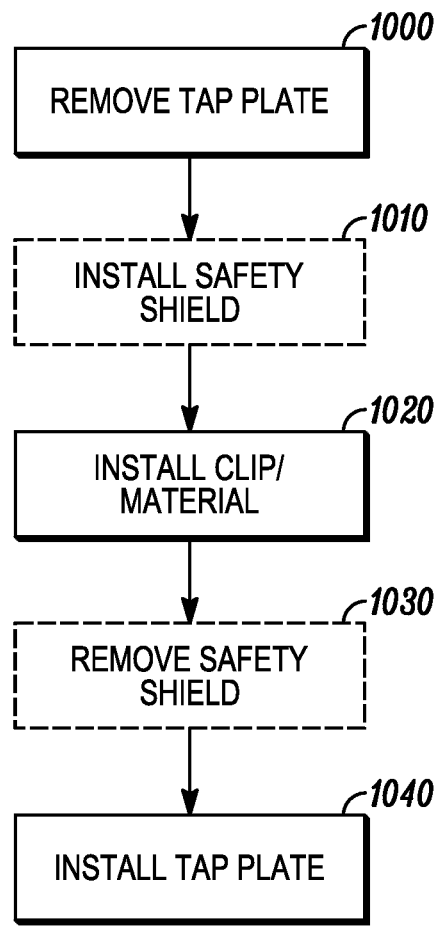
FIG. 10 illustrates an example process flow to expand the bandwidth of a conventional (present field-installed) tap without replacing the housing, according to one embodiment.

FIG. 10 illustrates an example process flow to expand the bandwidth of conventional (field-installed) taps without replacing the housing, according to one embodiment. Initially, the tap plate (RF electronics) is removed from the tap 1000. The safety shield may then be connected to the tap to cover the areas of the tap having power 1010. It should be noted that in operation, the installer may preclude installing the safety shield. The resonance restricting material may be secured to the bypass line using, for example, the clip 1020. If the safety shield was utilized, the safety shield is removed 1030. A tap plate is then installed on the tap 1040. The tap plate installed may be a new tap plate with a higher bandwidth. Alternatively, the tap plate installed may be the same tap plate that was removed or a replacement tap plate if the resonance restricting material was installed to reduce losses occurring within the current bandwidth spectrum. For example, if the CATV network currently supported 1.2 GHz bandwidth and the present field-installed tap supported a bandwidth of 1.2 GHz but experienced losses at the upper edge of this bandwidth, the resonance restricting material may be installed to ensure the tap can support the entire bandwidth.

The use of the resonance restricting material 410 may cause additional tap input to output insertion loss when the tap plate is removed and the signals and power are being transmitted down stream via the bypass line 240. However, the operation of a tap without the tap plate is not a typical operational mode. Rather, this scenario occurs when the tap plate has been removed for repair, replacement or upgrade and is a temporary situation. Accordingly, it will have minimal service impact.

Figure 11:
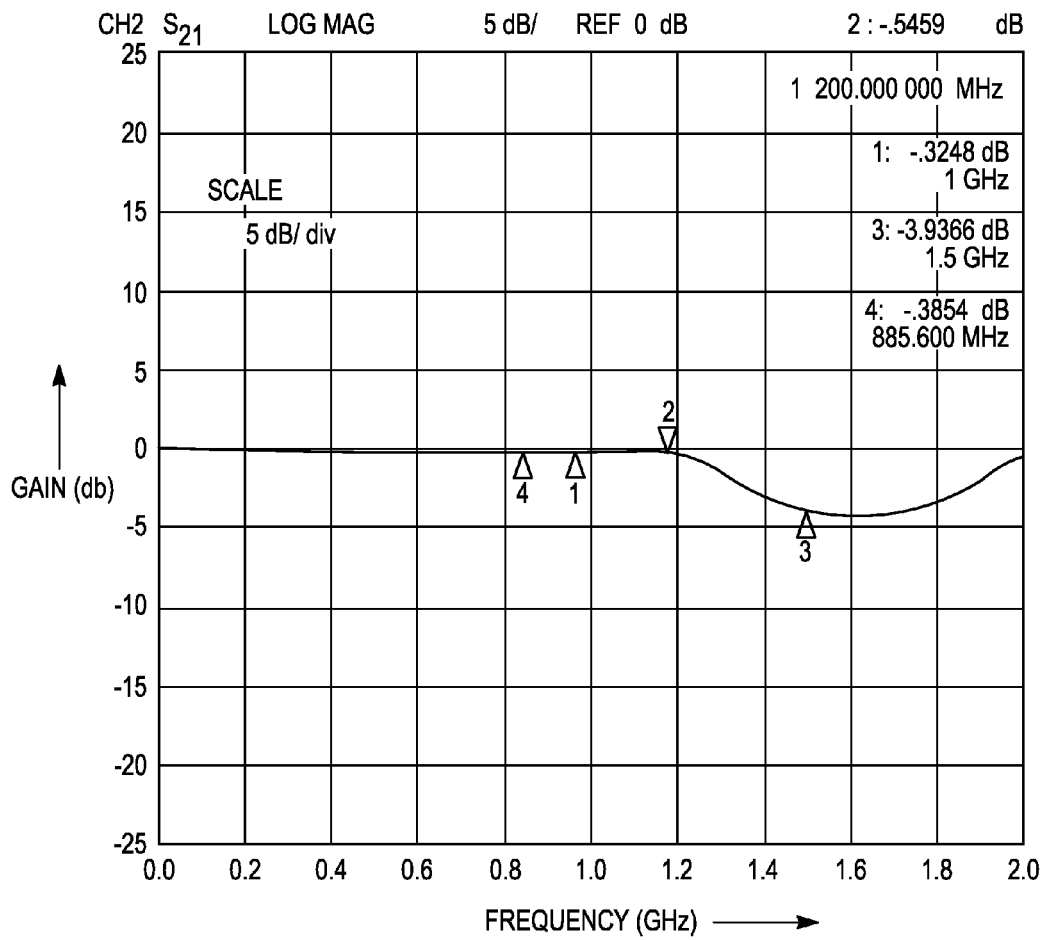
FIG. 11 illustrates an example graph of the input to output insertion loss of a conventional (present field-installed) tap with the tap plate removed.

FIG. 11 illustrates an example graph of the input to output insertion loss of a conventional (present field-installed) tap with the tap plate removed. As illustrated, there is negligible losses through approximately 1.2 GHz.

Figure 12:
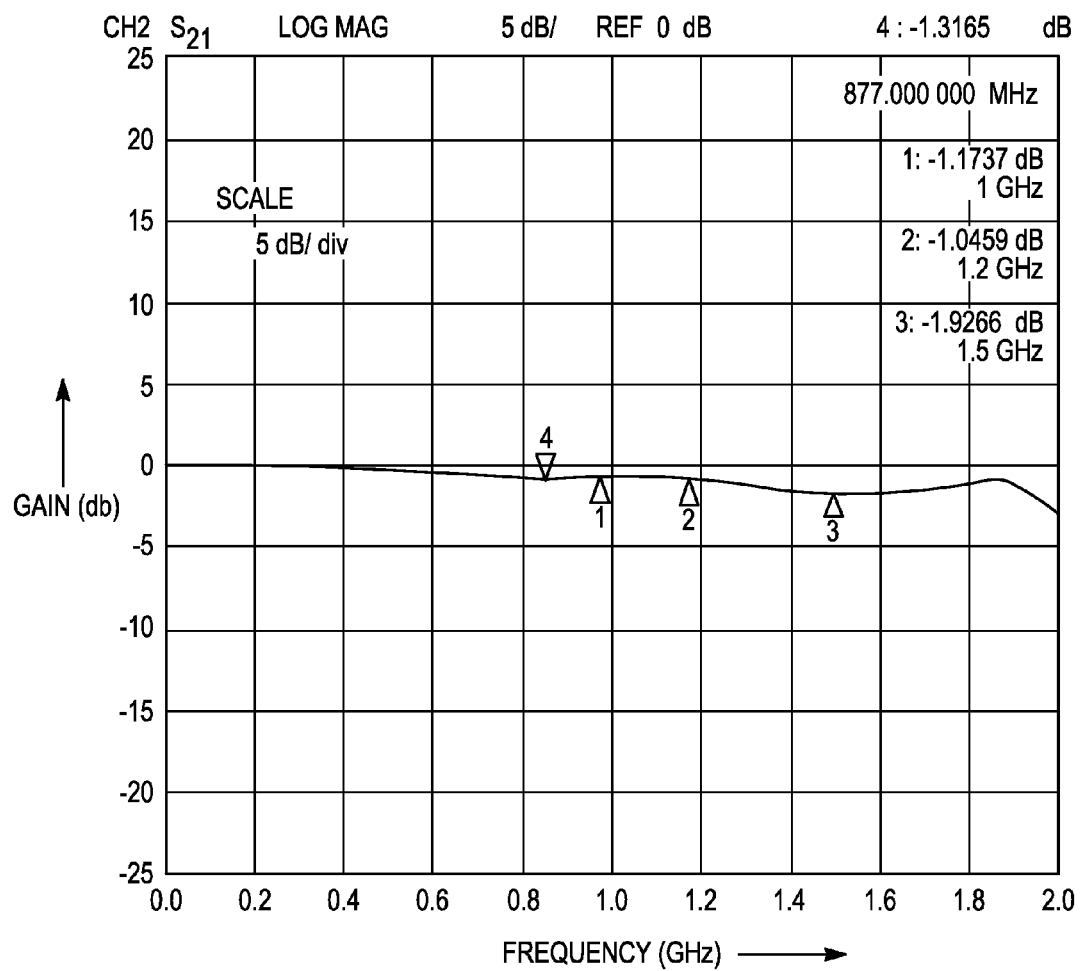
FIG. 12 illustrates an example graph of the input to output insertion loss of a conventional (present field-installed) tap with the tap plate removed utilizing the resonance restricting material in communication with the bypass line, according to one embodiment.

FIG. 12 illustrates an example graph of the input to output insertion loss of a conventional (present field-installed) tap with the tap plate removed utilizing the resonance restricting material 410 in communication with the bypass line 240, according to one embodiment. As illustrated, approximately 1 or 2 dB of loss occur between 600 MHz and 1.2 GHz.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. A cable television tap comprising
a housing;
connectors to receive a main transmission line;
a tap plate in communication with the connectors, wherein the tap plate includes RF circuitry to receive RF signals from the main transmission line, to provide a conduit for the RF signals to pass through the cable television tap, and to process the RF signals for communication with a customer;
a bypass line to provide an alternative conduit through the cable television tap when the tap plate is removed; and
a resonance restricting material in electromagnetic communication with the bypass line, wherein the resonance restricting material reduces resonances generated by the bypass line and reduces insertion losses in RF range and enables bandwidth for the cable television tap to be increased, wherein the resonance restricting material is disposed in electromagnetic communication with the bypass line using a non-conductive clip, and further wherein the resonance restricting material is configured to be disposed in electromagnetic communication with the bypass line while the cable television tap is powered.

2. The cable television tap of claim 1, wherein the resonance restricting material is an EMI shielding material.

3. The cable television tap of claim 1, wherein the resonance restricting material is a ferromagnetic material.

4. The cable television tap of claim 1, wherein the resonance restricting material is a conductive elastomer that includes an elastomer binder and a ferromagnetic conductive filler.

5. The cable television tap of claim 4, wherein the elastomer binder is silicone and the conductive filler is a combination of nickel (Ni) and carbon (C).

6. The cable television tap of claim 1, wherein the non-conductive clip includes conductive contacts to electrically connect the resonance restricting material to the housing.

7. The cable television tap of claim 1, wherein the resonance restricting material is connected to an underside of the bypass line.

8. The cable television tap of claim 1, wherein the bypass line comprises a non-conductive material insulating a length of a conductive transmission line.

9. The cable television tap of claim 1, wherein the resonance restricting material is in physical contact with the bypass line.

10. The cable television tap of claim 1, wherein the electromagnetic communication comprises an electromagnetic resonance effect.

11. A cable television tap utilized in a cable television network to provide a connection point for a customer to access services provided by the cable television network, wherein the cable television tap includes a housing, connectors to secure to a main transmission line, a tap plate to process RF signals to provide for communication with the customer, and a bypass line to provide an alternative conduit through the cable television tap when the tap plate is removed, wherein the bypass line generates resonances at a defined frequency in response to RF parameters in the cable television tap and the resonances increase insertion losses at the defined frequency and precludes bandwidth of the cable television tap being increased above the defined frequency, wherein an improvement comprises
a resonance restricting material in electromagnetic communication with the bypass line, wherein the resonance restricting material attenuates the resonances generated by the bypass line at the defined frequency and reduces the insertion losses at the defined frequency and enables the bandwidth of the cable television tap to be increased without requiring the housing to be replaced, wherein the resonance restricting material is disposed in electromagnetic communication with the bypass line using a non-conductive clip, and further wherein the resonance restricting material is configured to be disposed in electromagnetic communication with the bypass line while the cable television tap is powered.

12. The cable television tap of claim 11, wherein the resonance restricting material restricts the resonances created at approximately 1.2 GHz.

13. The cable television tap of claim 11, wherein the resonance restricting material enables the bandwidth of the cable television tap to be increased from 1.0 GHz to 1.5 GHz.

14. The cable television tap of claim 11, wherein the resonance restricting material is an EMI shielding material having lossy characteristics in range of the defined frequency.

15. The cable television tap of claim 11, wherein the resonance restricting material is a conductive elastomer that includes an elastomer binder and a ferromagnetic conductive filler.

16. The cable television tap of claim 15, wherein the elastomer binder is silicone and the conductive filler is a combination of nickel (Ni) and carbon (C).

17. The cable television tap of claim 11, wherein the non-conductive clip includes conductive contacts to electrically connect the resonance restricting material to the housing.

18. The cable television tap of claim 11, wherein the bypass line comprises a non-conductive material insulating a length of a conductive transmission line.

19. The cable television tap of claim 11, wherein the resonance restricting material is in physical contact with the bypass line.

20. The cable television tap of claim 11, wherein the electromagnetic communication comprises an electromagnetic resonance effect.

21. A method to increase bandwidth of a field-installed cable television tap that includes RF circuitry for processing RF signals from a main transmission line, the method comprising removing a tap plate from the cable television tap;

installing, while the cable television tap is powered, a resonance restricting material in electromagnetic communication with a bypass line for the cable television tap, wherein the resonance restricting material attenuates resonances generated by the bypass line at a defined frequency and reduces the insertion losses at the defined frequency and enables the bandwidth of the cable television tap to be increased above the defined frequency, wherein installing the resonance restricting material includes installing a non-conductive clip supporting the resonance restricting material disposed in electromagnetic communication with the bypass line so the resonance restricting material is in electromagnetic communication with the bypass line, and further wherein the resonance restricting material is configured to be disposed in electromagnetic communication with the bypass line while the cable television tap is powered; and installing the tap plate on the cable television tap, wherein the tap plate supports increased bandwidth.

22. The method of claim 21, wherein installing the non-conductive clip includes installing a non-conductive clip having conductive tabs formed therein to provide electrical contact between the resonance restricting material and housing of the cable television tap.

23. The method of claim 21, further comprising installing a non-conductive shield on the cable television tap after the tap plate is removed to cover portions of the cable television tap powered to prevent inadvertent contact therewith when installing the resonance restricting material on the bypass line; and removing the non-conductive shield from the cable television tap after the resonance restricting material is installed and prior to installing the tap plate.

* * * * *